United States Patent

[11] 3,622,170

| [72] | Inventor | Robert K. Sedgwick<br>Brookfield, Wis. |
|---|---|---|
| [21] | Appl. No. | 1,237 |
| [22] | Filed | Jan. 7, 1970 |
| [45] | Patented | Nov. 23, 1971 |
| [73] | Assignee | Kearney & Trecker Corporation<br>West Allis, Wis.<br>Original application May 20, 1968, Ser.<br>No. 730,440, now Patent No. 3,533,638.<br>Divided and this application Jan. 7, 1970,<br>Ser. No. 1,237 |

[54] TOOL-LOCKING MECHANISM
5 Claims, 4 Drawing Figs.

| [52] | U.S. Cl. | 279/89,<br>279/109 |
|---|---|---|
| [51] | Int. Cl. | B23b 31/10 |
| [50] | Field of Search | 90/11 A;<br>279/1 B, 89, 77, 109 |

[56] References Cited
UNITED STATES PATENTS

| 3,043,614 | 7/1962 | Eichmann | 279/77 X |
|---|---|---|---|
| 1,467,992 | 9/1923 | Becker | 279/109 X |
| 3,150,878 | 9/1964 | Budden et al. | 90/11 A X |
| 3,490,333 | 1/1970 | Scruton | 90/11 A |

*Primary Examiner*—Andrew R. Juhasz
*Assistant Examiner*—Bilinsky, Z. R.
*Attorneys*—Cyril M. Hajewski, William C. Gleisner and Donald E. Porter ABSTRACT: A plurality of latches are utilized within the spindle of a machine tool to pivotally engage a bearing surface on a tool arbor. Within the arbor cavity of the spindle, there is provided an actuator mechanism which is attached to a drawbar operable to effect the movement of the latches into and out of locking position.

PATENTED NOV 23 1971 3,622,170

INVENTOR
ROBERT K. SEDGWICK

ATTORNEY 3,622,170

TOOL-LOCKING MECHANISM

BACKGROUND OF THE INVENTION

The present invention relates generally to improvements in spindle and tool arbor construction and more particularly to spindles and tool arbors adapted for the quick change of tools. The present application is a division of my copending Pat. application, Ser. No. 730,440, filed May 20, 1968, for Tool-Locking Mechanism, now U.S. Pat. No. 3,533,638.

SUMMARY OF THE INVENTION

According to this invention, there is provided an improved locking means in a machine tool spindle for the quick and positive retention of a tool arbor. The operating end of the spindle is provided with an enlarged cavity in which a plurality of latches are adapted to be moved radially into wedging engagement with a conical bearing surface formed on the inwardly extending end of the tool arbor. Each latch has a bearing surface which is slightly tilted with respect to the swing radius of the latch so that the angle formed by a swing radius line drawn through the leading inward edge of the latch bearing surface and a line drawn tangent to said latch bearing surface will form an angle greater than 90°. Thus, when the latches are swung into the arbor locking position, the slightly tilted bearing surface of each latch will swing into full-bearing contact with the bearing surface on the arbor. Within the arbor cavity of the spindle, there is provided an actuator or motion mechanism which is attached to a drawbar operable to effect the movement of the latches into and out of locking position through the operation of motion translating members.

It is the general object of the invention to provide a machine tool spindle with improved tool arbor locking means to provide for the quick change of tools.

It is another object of this invention to provide a tool arbor locking mechanism which is rigid in the axial direction.

It is another object of this invention to provide a tool spindle with a plurality of force applying tool latch mechanisms which are automatically moved into tool locking position.

It is another object of this invention to provide tool arbor locking latches which are subjected to compressive forces only while in the locking position.

It is a further object of this invention to provide an improved spindle having tool arbor locking latches which are self-seating under working stresses.

DESCRIPTION OF THE PREFERRED EMBODIMENTS

Figure 1:
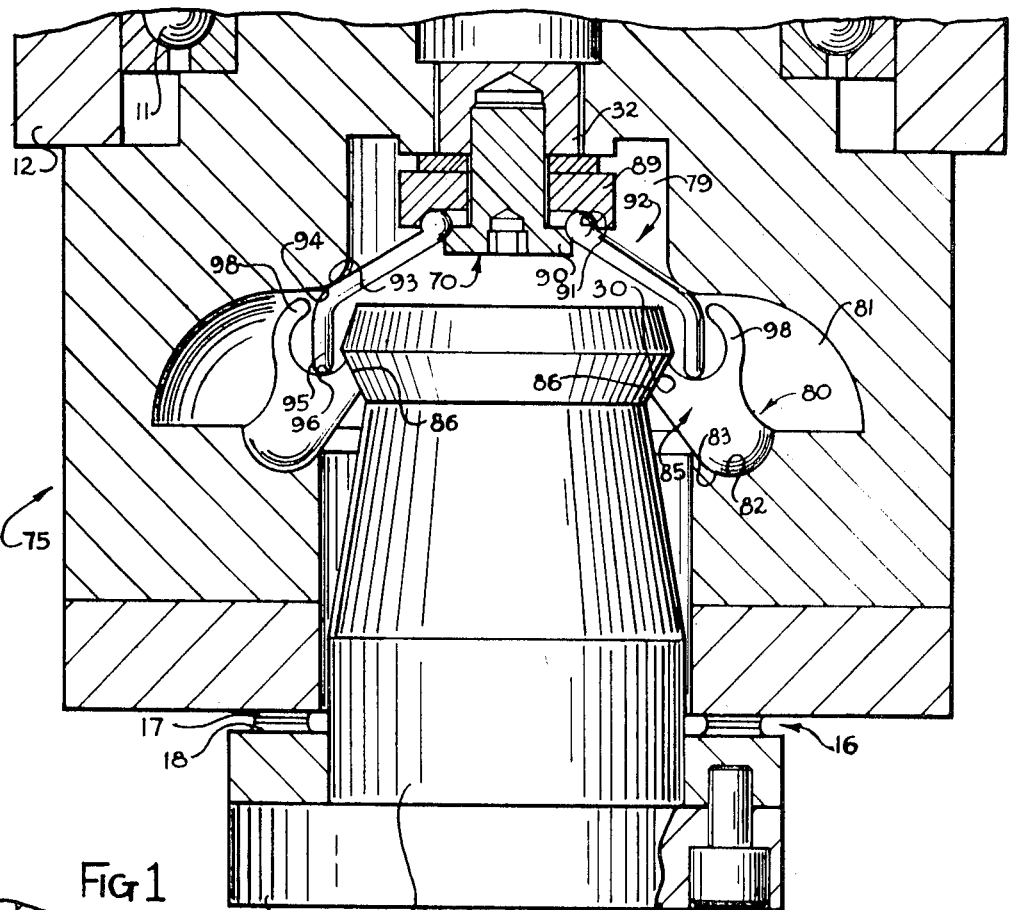
FIG. 1 is a fragmentary view in vertical section through a machine tool spindle incorporating the features of the present invention.

Referring now to the drawings, and more specifically to FIG. 1, there is illustrated a machine tool spindle and a tool arbor incorporating the features of the present invention. As there shown, the lower end of the spindle 75 is rotatably supported at its forward end by a bearing 11 which is fixedly disposed in a spindle housing 12. A tool arbor 15 having a straight shank portion 14 is positioned in axial alignment in the spindle 10 by operation of a gear coupling 16. The coupling 16 comprises an upper half portion 17 which is secured to the spindle 10 and a lower half portion 18, which is secured to the tool arbor 15. Each half portion 17 and 18 have complementary radially formed angular clutch teeth adapted to meshingly engage with each other. As a result, with the tool arbor 15 inserted into the spindle 10 the arbor 15 will be automatically centered with respect to the spindle 10 so that the axis of the spindle 10 will coincide with the axis of the tool arbor 15 and a driving connection between the tool arbor 15 and the spindle 10 will also be established.

To quickly and positively lock a tool carrying arbor in operative position within the spindle 10 a plurality of radially movable tool locking latches are provided. The locking latches 80 are pivotally mounted within an annular space 81 formed in the opening of the spindle 75. The annular space 81 is formed with an annular toroidal groove 82 which is complementary to the toroidal surface 83 formed on each of the latches 80. As shown in FIG. 1, each latch 80 has a finger 85 having a conical surface 86 complementary to the conical surface 30 formed on the shank of the tool arbor 15. The bearing surfaces 86 of the latches 80 are slightly tilted with respect to the swing radius of the latch so that a nonsticking angular relationship is established between the bearing surface 86 of each latch and the conical bearing surface 30 on the tool arbor when the latch moves into locking position.

Figure 4:
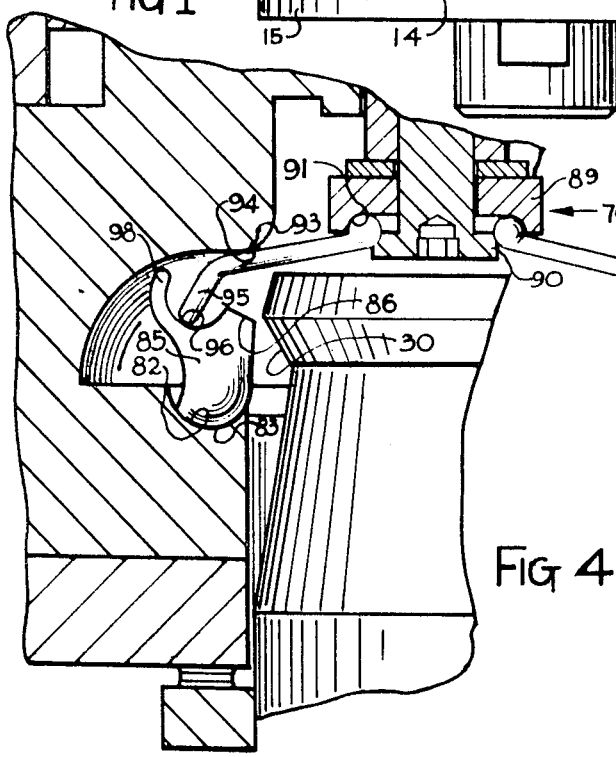
Figures 2, 3:
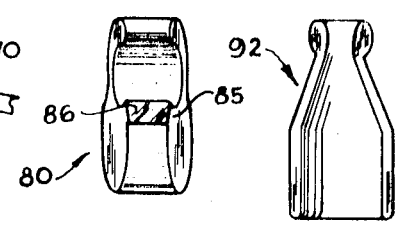
FIG. 2 is a detailed view in front elevation of the locking latch, shown in FIG. 1.
FIG. 3 is a detailed view in front elevation of a link actuator, shown in FIG. 1; and, FIG. 4 is a fragmentary side view of a latch of FIG. 1, showing the position of the latch and its associated link in a released position.

The lower end of a drawbar 32 extends inwardly into the arbor cavity 79, as shown in FIG. 1. The drawbar 32 is urged in an upward direction, as shown in FIG. 1, which is the tool arbor lock position, by a spring (not shown). The drawbar is moved in an axially downward direction, as shown in FIG. 4, which is the tool arbor release position, by a power actuator (not shown) or manually in a well-known manner. A holding member 70 comprising a washer 89 is secured to the lower end of the drawbar 32 by a screw 90. The washer 89 and the screw 90 cooperate to form a circular groove 91 which receives a plurality of links 92, as shown in FIGS. 1, 3 and 4. The links 92 are loosely held in the groove 91 so that they may be free to pivot from their tool arbor lock positioning, as shown in FIG. 1, to their tool arbor release position, as shown in FIG. 4. The links 92 are formed by cutting an annular-shaped shell into segmented pieces of equal size, one of which is shown in detail in FIG. 3.

When it is desired to place a new tool arbor in the spindle 75 the holding member is moved axially downward by power means as for example the drawbar 32, as shown in FIG. 4, by the power actuator (not shown) and then the tool arbor is placed in the spindle. With the tool arbor in position within the spindle 75, the drawbar 32 is moved axially upward, thereby drawing the plurality of links 92 axially upward and radially inward. As the links 92 are moved upwardly and inwardly, as viewed in FIG. 1, a shoulder 93 of each link 92 engages the circular surface 94 within the annular space 81. This combination of movements, that is the axially upward movement of the links 92 and the engagement of the link shoulders 93 with the annular surface 94, will operate to effect the pivotal movement of each link so that the lower leg 95 of each link 92 is caused to move radially inwardly. As the legs 95 of the links 92 move radially inward, the lower ends thereof engage a curved bearing surface 96 presented toward the upper end of each latch finger 85, forcing the latches to pivot in the toroidal groove 82. This will serve to forcefully engage the bearing surface 86 of each latch finger 85 with the conical bearing surface 30 on the tool arbor 15 effecting the seating and locking of the tool arbor in the spindle.

To release the tool arbor 15 from the spindle 75, the holding member 70 by means of the drawbar 32 is moved axially downward by actuating the power actuator (not shown), thereby moving the plurality of links 92 axially downward and radially outward. As the links 92 are moved downwardly and outward, a shoulder 93 of each link 92 engages a thumb 98 on each latch 92. This combination of movements, that is the axially downward and radially outward movement of the links 92 and the engagement of the link shoulders 93 with the latch thumb 98, will operate to effect the pivotal movement of the latch 80 in the toroidal groove 82, moving the latch finger 85 out of engagement with the tool arbor bearing surface 30, as shown in FIG. 1.

From the foregoing detailed description of the illustrative embodiments set forth herein to exemplify the present invention, it will be apparent that there has been provided an arrangement for rapid locking of a tool arbor through the use of a gear coupling or other keying device that provides location of the tool arbor in the spindle combined with a latching system that locks the tool arbor in the spindle.

The principles of this invention having now been fully explained, I hereby claim as my invention:

1. In a tool-locking mechanism;
   a spindle having an axial opening adapted to receive a tool arbor, said spindle having an internal annular recess;
   a plurality of latches pivotally mounted within the annular recess of said spindle in spaced circumferential relationship about the axis of said spindle for pivotal movement into and out of tool arbor locking engagement, each of said latches presenting at its upper end a curved bearing surface respectively engaging the lower end of an actuating member;
   a drawbar supported in said spindle for axial movement and arranged to extend into the internal annular recess formed in said spindle, said drawbar being operably connected to effect the pivotal movement of said latches into and out of tool arbor locking engagement; and,
   a plurality of members pivotally attached to the end of said drawbar which extends into the annular recess formed in said spindle to move axially with said drawbar, said plurality of actuating members being spaced about said spindle and each being provided with a latch engaging surface for respectively engaging the said curved bearing surfaces respectively and individually presented by said latches pivotally mounted within said annular recess,
   whereby pivotal movement of said members in a first direction engages the curved bearing surfaces to effect simultaneous pivotal movement of associated ones of said latches into locking engagement with a tool arbor inserted into said spindle and whereby pivotal movement of said members in a second direction engages the curved bearing surfaces to effect pivotal disengagement of said latches from the tool arbor.

2. A tool-locking mechanism according to claim 1 wherein said plurality of latches are respectively guided within said annular opening for pivotal movement to radial outward position in which the upper ends thereof are in a retracted unlocked position, and wherein said plurality of latches are respectively guided within said annular opening for pivotal movement to a radially inward position in which the respective upper inner ends of said plurality of said latches are respectively urged into locked engagement with a conical locking surface presented by an arbor inserted in said spindle.

3. A tool-locking mechanism according to claim 2 wherein said latches are each respectively provided at its upper inner end with a conical locking surface substantially complementary to the conical locking surface presented by the tool arbor whenever said latches are pivotally actuated into locking engagement therewith.

4. A tool-locking mechanism according to claim 1 wherein there is provided power means connected to said drawbar and operable when actuated to move said plurality of members in a second direction to pivot said latches out of arbor locking position for releasing the arbor from said spindle.

5. In a tool-locking mechanism for a machine spindle having an axial opening adapted to receive a tool arbor, said spindle being provided with an internal annular recess spaced rearwardly from the spindle receiving end thereof and said spindle being provided at its forward end with forwardly extending arbor engaging drive means;
   an axially movable holding member disposed within said internal recess formed in said spindle;
   a plurality of latches pivotally mounted within said internal annular recess formed in said spindle for selective movement from radially retracted pivotally outward positions therein to pivotally forward positions into locked engagement with the rearward end of a tool arbor inserted into said spindle, said latches respectively presenting at their upper ends a curved bearing surface;
   a plurality of actuating fingers respectively being pivotally secured at one end to said holding member and at their opposite end engaging said curved bearing surface of one of said latches;
   a tool arbor presenting a conical inner end and spindle engaging drive means, said arbor being fully insertable into said spindle for moving said drive means into engagement therewith; and,
   actuating means connected to move said holding member axially for moving said actuating fingers in a direction to pivotally urge said latches radially forward into locked engagement with said conical end of said arbor.

* * * * *